United States Patent [19]
Hyer

[11] 3,754,433
[45] Aug. 28, 1973

[54] FLUIDIC PROXIMITY SENSOR
[75] Inventor: James M. Hyer, South Bend, Ind.
[73] Assignee: The Bendix Corporation, South Bend, Ind.
[22] Filed: Sept. 17, 1971
[21] Appl. No.: 181,455

[52] U.S. Cl. ............................................... 73/37.6
[51] Int. Cl. ......................................... G01b 13/12
[58] Field of Search ............................. 73/37.6, 37.8

[56] References Cited
UNITED STATES PATENTS
2,684,568 7/1954 Senger ............................. 73/37.6 X
2,972,883 2/1961 Gyurko ............................... 73/37.8
3,363,453 1/1968 Erickson .......................... 73/37.6 X
3,210,987 10/1965 Bruns .................................. 73/37.6

FOREIGN PATENTS OR APPLICATIONS
832,802 4/1960 Great Britain ........................ 73/37.8

Primary Examiner—Richard C. Queisser
Assistant Examiner—Daniel M. Yasich
Attorney—Gordon H. Chenez et al.

[57] ABSTRACT

A fluidic proximity sensor particularly adapted to sense clearance between gas turbine engine compressor blade tips and adjacent wall of a compressor housing. In one embodiment, there is provided an air flow passage having a chamber with an inlet and a restricted outlet in series flow relationshp. The inlet receives compressor pressurized air and is arranged in a predetermined relatively close spaced-apart relationship with a compressor blade tip which sweeps the inlet to vary the effective flow area thereof. The resulting pressure pulses are integrated in the chamber and the resulting pressure compared to a regulated reference fluid pressure by means of a pressure differential responsive device, the output of which represents the radial clearance between the compressor blade tips and adjacent housing wall. In another embodiment, a second air flow passage connected in parallel flow with the above-mentioned air flow passage is provided with a pair of series flow restrictions between which a reference pressure is generated. The inlet to the second passage is not affected by the compressor blade tips. The reference pressure is compared to the chamber pressure representing the radial clearance between the compressor blade tips and adjacent wall.

10 Claims, 4 Drawing Figures

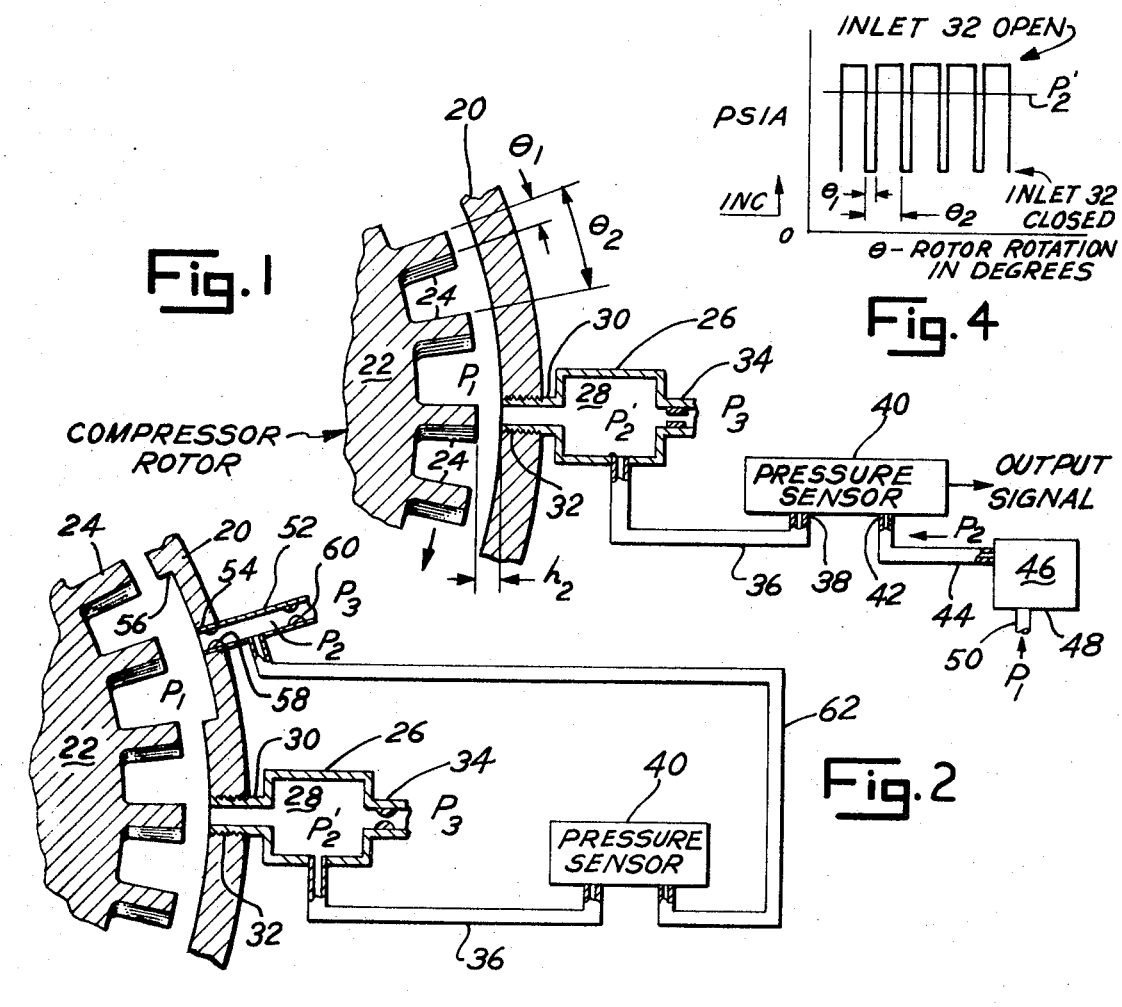
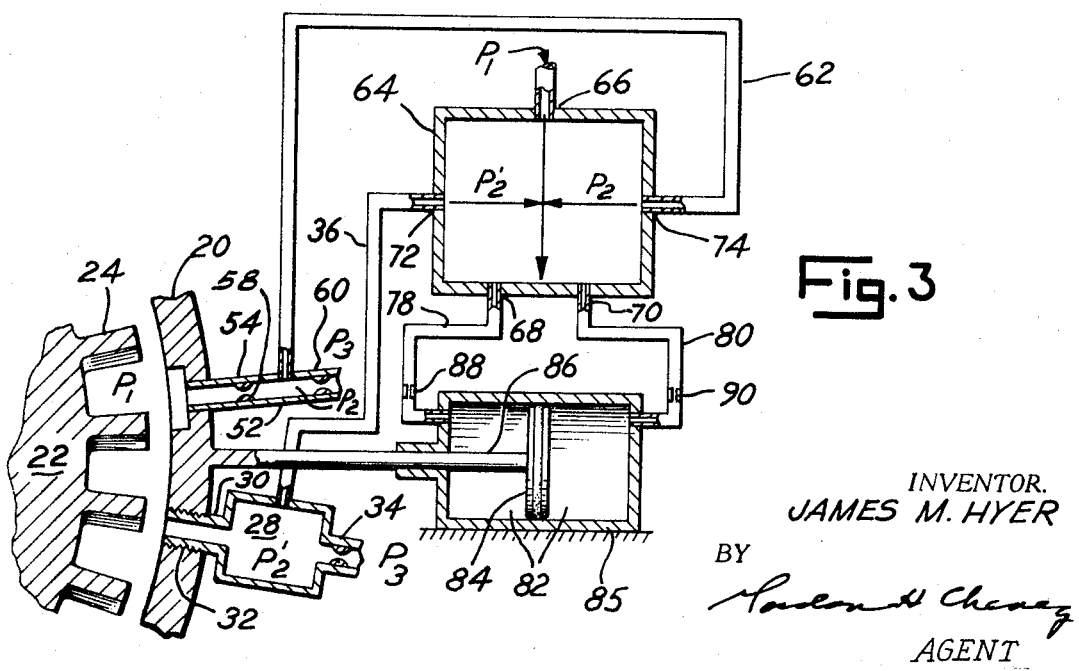

FLUIDIC PROXIMITY SENSOR

BACKGROUND OF THE INVENTION

Gas turbine engines particularly for use in high performance aircraft where engine efficiency is of utmost importance are well known. Such engines utilize axial flow air compressors characterized by high air compression ratios to produce the desired operational engine power. The rising air pressure generated as air flow progresses through the various stages of the axial compressor is adversely affected as clearance between the compressor blade tips and adjacent compressor housing wall increases from a predetermined minimum by virtue of inherent manufacturing tolerances and resulting mismatch of compressor and housing, inability to measure accurately the clearance existing between blade tips and housing wall in the assembled condition, as well as the influence of high pressure, high temperature air and resulting differential radial expansion between the compressor blades and housing surrounding the same.

Since the gas turbine engine compressor operates under high temperature, high pressure and high frequency vibration conditions and space allocation as well as weight are extremely limited, very little effort has been expended in attempting to devise a practical proximity sensor for use in such an environment by virtue of the undesirable limitations of mechanical and electrical devices. Various prior art fluidic or pneumatic proximity sensors for sensing dimensional characteristics of piece parts and the like are known but such sensors are impractical for use for obvious reasons in the above-mentioned compressor environment wherein the clearance to be measured is between a continuously rotating compressor and a stationary housing surrounding the same.

It will be recognized that the present invention, although adapted for detecting clearance between compressor blade tips and adjacent housing may be applicable to any similar structural arrangement such as rotatable gears or the like as well as the clearance between fixed or movable surfaces.

It is an object of the present invention to provide a fluidic proximity detector for detecting the radial clearance between blades of a compressor and housing wall surrounding the same at all times during operation of the engine.

It is an important object of the present invention to provide a fluidic proximity detector capable of accurately and reliably detecting the clearance between a rotatable member and stationary member operatively associated therewith.

It is another object of the present invention to provide a fluidic proximity detector for detecting compressor blade/compressor housing clearance of a gas turbine engine and which may be attached to an engine with relatively minor modification of existing engine structure.

BRIEF DESCRIPTION OF THE DRAWINGS

FIG. 1 illustrates in schematic form a portion of a conventional axial compressor rotor with blades and surrounding compressor housing embodying the present proximity sensor.

FIG. 2 illustrates in schematic form the compressor rotor with blades and surrounding housing of FIG. 1 with a second embodiment of the present invention.

FIG. 3 illustrates in schematic form the structure of FIG. 2 and further embodying control means for adjusting the compressor housing relative to the compressor blades.

FIG. 4 illustrates a plot of air pressure in PSIA versus compressor rotor rotation in degrees, $\theta$, showing pressure pulses generated and resulting integrated pressure derived therefrom.

DESCRIPTION OF THE PREFERRED EMBODIMENTS

Referring to FIG. 1, numeral 20 designates a gas turbine engine housing or casing which houses an axial flow compressor the rotor 22 of which is provided with a plurality of stages each of which are defined by associated circumferentially spaced apart, radially extending, arcuate blades 24. As pointed out heretofore, for optimum compressor efficiency, it is desirable to maintain the radial spacing $h_2$ between the tips of blades 24 and the housing 20 at a minimum without interference between the blades 24 and housing 20.

A casing 26 defines a fluid chamber 28 having a tubular fluid inlet 30 and a restricted fluid outlet 34. The inlet 30 may be threaded or otherwise adapted to be secured in an opening 32 in housing 20 with the inlet end thereof flush with the inner wall of housing 20. The inlet 30 is aligned with blades 24 in predetermined spaced relationship radially outwardly from the tips thereof. As the rotor 22 turns, the tips of blades 24 are carried past the inlet 30 causing a periodic variation in the effective flow area thereof depending upon the speed of rotation of rotor 22 and the spacing between the inlet 30 and tip of blade 24. The restricted outlet 34 is in series flow relationship with inlet 30 and vents chamber 28 to a relatively low pressure drain source which may be the atmosphere at pressure $P_3$ or a subatmospheric pressure derived from vacuum generating means, not shown. In either event, the effective flow area of outlet 34 is preferably fixed at a predetermined value such that a sonic flow of air therethrough is established. It will be recognized that such sonic flow is present providing the pressure $P_3$ downstream from outlet 34 does not exceed $0.528 P'_2$ wherein $P'_2$ is the pressure upstream from outlet 34. The principle of operation of two series flow restrictions such as inlet 30 and outlet 34 wherein the pressure intermediate the same varies as a predetermined function of the area ratio of the series restrictions is well known and understood by those persons skilled in the art of fluid flow. It will be recognized that the passage of blades 24 over inlet 30 results in a series of pressure pulses having a frequency depending upon the rotational speed of rotor 22 which pulses are integrated by virtue of a suitable volume capacity of chamber 28 to establish a time constant of the flow circuit including inlet 30, chamber 28 and outlet 34 sufficiently large with respect to the pressure pulse period. FIG. 4 illustrates a plot of pressure versus degrees of rotor 22 rotation and the resulting substantially steady integrated pressure derived therefrom. A passage 36 vents pressure $P'_2$ from chamber 28 to an inlet 38 of a conventional pressure differential sensing mechanism 40 which has a second inlet 42 connected via a passage 44 to a suitable source of fluid at regulated pressure $P_2$. The fluid at pressure $P_2$ may be derived from a conventional air pressure regulating device generally indicated by 46 and having an inlet 48 connected via a passage 50 to receive compressor pressurized air at pressure $P_1$. The pressure regulating device 46 operates to regulate the flow of air at pressure $P_1$ to maintain pressure $P_2$ derived therefrom a constant predetermined fraction of pressure $P_1$.

The integrated pressure $P'_2$ may be expressed by the relationship:

$$P'_2 = P_1 (C_{20} A_{20}/C_4 A_4) - R [P_1 (C_{20} A_{20}/C_4 A_4) - P_1 (C_{2C} A_{2C}/C_4 A_4)] \quad (1)$$

wherein $C_{20}$ represents the flow coefficient for inlet 30 open, $A_{20}$ the effective flow area of open inlet 30, $C_4$ the flow coefficient of outlet 34, $A_4$ the flow area of outlet 34, $C_{2C}$ the flow coefficient of inlet 30 closed, $A_{2C}$ the effective flow area of closed inlet 30 and R represents closure ratio $\theta_1/\theta_2$ or the ratio of the width of the section of a blade tip which sweeps inlet 30 to the distance between adjacent blade centerlines measured along the blade tip diameter.

By substitution and dividing by $P_1$, equation (1) may be rewritten as:

$$P'_2/P_1 = (C_{20} \pi d_2^2/4/C_4 \pi d_4^2/4) - R [(C_{20} \pi d_2^2/4/C_4 \pi d_4^2/4) - (C_{2C} \pi d_2 h_2/C_4 \pi d_4^2/4)] \quad (2)$$

wherein $h_2 \leq d_2/4$ and represents the clearance between a blade tip and inlet 30, $d_2$ the inside diameter of inlet 30 and $d_4$ the effective flow diameter of outlet 34.

Simplifying and rearrangement of equation 2 gives:

$$P'_2 = P_1 (d_2^2/d_4^4) [(1-R)(C_{20}/C_4) + 4R (C_{2C}/C_4)(h_2/d_2)] \quad (3)$$

Thus, $P'_2$ varies as a function of $P_1$, $d_2$, $d_4$, R and $h_2$. Since $d_2$ and $d_4$ as well as $C_{20}$ and $C_{2C}$ are fixed quantities by circuit design and R is a fixed quantity depending upon the geometry of the blades 24, the pressure $P'_2$ can be said to vary only as a function of $P_1$ and $h_2$. Also, since $P_2$ is a constant fraction of pressure $P_1$, it will be recognized that the output pressure differential $P_2 - P'_2$ may be referenced to $P_1$ as by $P_2 - P'_2/P_1$ to thereby eliminate the effect of variations of $P_1$ on the pressures $P_2$ and $P'_2$. As a result, it will be noted that the pressure differential $P_2 - P'_2$ varies only as a function of $h_2$.

Referring to FIG. 2, structure similar to that of FIG. 1 is identified by like numerals. The primary difference between FIGS. 1 and 2 is that the reference pressure $P_2$ of FIG. 2 is generated by a second flow circuit having two series flow restrictions therein. The second flow circuit is defined by a conduit member 52 having an inlet end suitably secured in an opening 54 in housing 20 and an outlet end vented to a relatively low pressure source such as atmospheric air pressure $P_3$ or a subatmospheric air pressure generated by vacuum generating means, not shown. The housing 20 is recessed at 56 adjacent opening 54 to establish sufficient radial spacing between the tips of blades 24 and the inlet of conduit 52 such that the effective flow area of inlet conduit 54 is not affected by the passage of blades 24 thereby. Spaced apart fixed area flow restrictions 58 and 60 are disposed in conduit 52 in series flow relationship. The pressure differential sensing mechanism 40 is connected via passage 62 to the conduit 52 at pressure $P_2$ intermediate restrictions 58 and 60. As in the case of FIG. 1, the pressure $P_3 \leq 0.528 P_2$ to thereby maintain sonic flow through restriction 60.

It will be recognized that the pressure $P_2$ intermediate restrictions 58 and 60 varies as a function of the ratio of the effective fixed areas of the restrictions 58 and 60 and the variable air pressure $P_1$ upstream from restriction 58 none of which are influenced by the blades 24.

Assuming the effective flow area of restriction 60 and outlet 34 are equal, the pressures $P_2$ and $P'_2$ can be made equal when the effective flow area of inlet 30 is equal to the area of fixed restriction 58.

The effective flow area of inlet 30 is equal to $R (C_{2C} \pi d_2 h_2) + (1-R)(C_{20} \pi d_2^2/4)$ where R, $C_{2C}$, $d_2$ and $C_{20}$ are constants as defined above such that the area of inlet 30 becomes equal to the area of restriction 58 at a predetermined clearance $h_2$. For instance, a predetermined clearance $h_2$ of two thousandths of an inch may be desirable at which clearance the effective areas of inlet 30 and restriction 58 are equal and the pressures $P_2$ and $P'_2$ are equalized. As the clearance $h_2$ increases or decreases from the desired value, the effective flow area of inlet 30 increases or decreases accordingly causing a corresponding rise or fall in integrated pressure $P'_2$ while pressure $P_2$ remains unchanged thereby generating a pressure differential $P_2 - P'_2$ representing the relative clearance deviation. The pressure differential sensing mechanism 40 being vented to the pressures $P_2$ and $P'_2$ responds to the differential therebetween to produce a corresponding output signal for use as a direct clearance readout on suitable conventional visual means, not shown, or for use in actuating positioning means as shown in FIG. 3. It will be recognized that a pressure ratio sensing mechanism may be substituted for the differential sensing mechanism 40 in which case the pressure ratio $P_2/P'_2$ would be the sensed variable. At the predetermined clearance $h_2$ the pressure ratio $P_2/P'_2$ will become unity and increase or decrease therefrom as the clearance $h_2$ decreases or increases, respectively.

It will be recognized that the gain of pressure differential $P_2 - P'_2$ is directly proportional to pressure $P_1$. If desired, the gain effect of $P_1$ may be eliminated by referencing $P_2 - P'_2$ to $P_1$ in accordance with the relationship $P_2 - P'_2/P_1$ in which case the sensing mechanism 40 must be suitably vented and responsive to pressure $P_1$.

Referring to FIG. 3, elements similar to that of FIG. 2 are identified by like numerals. A conventional fluidic amplifier 64 of the proportional acting type is provided with a fluid inlet 66, fluid outlets 68 and 70 and opposing control fluid ports 72 and 74. The inlet 66 is connected via a conduit 76 to a suitable source of fluid at relatively high pressure such as compressor pressurized air $P_1$ which may be controlled to a predetermined constant pressure $P_S$ by suitable conventional fluid pressure regulating apparatus, not shown. The control fluid ports 72 and 74 are connected via passages 36 and 62, respectively, to conduit 54 at pressure $P_2$ and chamber 28 at pressure $P'_2$. The outlets 68 and 70 are provided with passages 78 and 80, respectively, which communicate with a chamber 82 on opposite sides of a piston 84 slidably carried in a fixed casing 85. A shaft 86 connects piston 82 with housing 20 which is adapted to be positioned radially toward or away from rotor 22 to thereby vary the clearance between housing 20 and blades 24. Suitable flow restrictions 88 and 90 may be placed in passages 78 and 80, respectively, to provide damping of piston 82 for the purpose of control stability.

The apparatus of FIG. 3 provides a closed loop clearance control. To that end, the pressure differential $P_2 - P'_2$ represents a clearance error feedback signal which acts transversely on the fluid power jet derived from inlet 66 thereby causing a proportional deflection of the same in the plane of outlets 68 and 70 between which the power jet flow is divided to produce a pressure differential or output at outlets 68 and 70 in proportion to the degree of deflection of the power jet.

As pointed out heretofore, for a given blade geometry, the restrictions 58 and 60, inlet 30 and outlet 34 and volume of chamber 28 may be suitably selected such that the $P_2 - P'_2$ pressure differential becomes zero (null error signal) only at a predetermined clearance, $h_2$, between the blades 24 and inlet 30. A clearance $h_2$ in excess of the predetermined value results in $P'_2 < P_2$ whereupon the power jet of amplifier 64 is deflected to the right as viewed in FIG. 3 causing an increase in flow and thus pressure through outlet 70 and a corresponding decrease in pressure through outlet 68. The resulting pressure differential imposed against piston 84 drives the same and thus movable housing 20 attached thereto toward rotor 22 thereby reducing the clearance $h_2$. Upon establishing the predetermined clearance $h_2$, the $P_2 - P'_2$ pressure differential becomes zero corresponding to the null clearance error whereupon the power jet of amplifier 64 is nulled reducing the pressure differential at outlets 68 and 70 to stabilize piston 84. A clearance $h_2$ less than the predetermined value results in $P'_2 > P_2$ which, in turn, causes reverse pressurization of piston 84 and corresponding movement of housing 20 away from rotor 22 to increase the clearance between blades 24 and inlet 30 until the pressures $P'_2$ and $P_2$ equalize indicating a null clearance error.

It will be recognized that the adjustable housing 20 and actuating means therefor including amplifier 64 and piston 84 of FIG. 3 may be utilized in the arrangement of FIG. 1 in which case the amplifier 64 may be substituted for the pressure differential sensor 40.

Further, it will be recognized by those persons skilled in the art of fluid flow that the flow through outlet 34 and restriction 60 although preferably sonic may be subsonic if so desired.

I claim:

1. A fluidic proximity sensor in a housing for determining the clearance between a first surface member and a spaced-apart movable second surface member having spaced-apart projections, said sensor comprising:
   means defining a gas chamber having a gas inlet operatively connected flush with an inner wall of said first surface member and a gas outlet in series flow relationship therewith;
   a source of pressurized gas to which said inlet is exposed;
   a source of relatively lower pressure gas to which said outlet is exposed thereby establishing gas flow through said fluid chamber;
   said spaced-apart projections movably arranged to sweep adjacent said inlet in succession to vary the effective flow area thereof depending upon the clearance between said projections and said inlet and generate a corresponding series of gas pressure pulsations which are integrated in said chamber; and
   gas pressure responsive means connected to said chamber and responsive to said integrated gas pressure therein for providing an output signal representing the clearance between said projections and said inlet.

2. A fluidic proximity sensor as claimed in claim 1 wherein:
   said gas outlet provides a predetermined fixed flow area;
   said gas pressure in said chamber varies as a predetermined function of the effective flow area ratio of said gas inlet and outlet.

3. A fluidic proximity sensor as claimed in claim 2 wherein:
   said gas outlet provides a predetermined fixed flow area and said source of relatively lower pressure gas does not exceed a pressure approximately one half of the gas pressure in said chamber to thereby maintain sonic flow through said outlet.

4. A fluidic proximity sensor as claimed in claim 1 wherein said first and second members, respectively, correspond to an air compressor housing and a compressor rotor mounted therein and provided with radially outwardly extending circumferentially spaced-apart blades having a predetermined radial spaced-apart relationship with said housing, and wherein:
   said inlet includes an opening in said housing communicating with compressor pressurized air.

5. A fluidic proximity sensor as claimed in claim 1 wherein:
   said inlet is circular and has an effective flow area which varies in accordance with the relationship $h_2 \pi d_2$ wherein $h_2 \leq d_2/4$ and designates the clearance between one of said projections and said inlet and $d_2$ designates the diameter of said inlet.

6. A fluidic proximity sensor as claimed in claim 1 wherein:
   said source of relatively lower gas pressure is subatmospheric.

7. A fluidic proximity sensor as claimed in claim 4 wherein:
   said housing is adjustable toward and away from said compressor rotor; and
   said gas pressure responsive means is operatively connected to said housing for adjusting the same to vary the clearance between the same and said blades in response to said output signal.

8. A fluidic proximity sensor as claimed in claim 7 wherein:
   said operative connection between said gas pressure responsive means and said housing includes servo means operatively connected to said housing and responsive to said output signal.

9. A fluidic proximity sensor as claimed in claim 1 and further including:
   a gas conduit including a restricted inlet exposed to said first named source of pressurized gas and a restricted outlet exposed to said source of relatively lower pressure gas;
   said restricted inlet and outlet being in series flow relationship and having a predetermined constant flow area ratio whereby the gas pressure intermediate the same varies as a predetermined function of the pressure of the gas at said first named source to provide a reference gas pressure;

said gas pressure responsive means including pressure differential responsive means responsive to said reference pressure and said chamber gas pressure.

10. A fluidic proximity sensor as claimed in claim 1 and further including:

means for generating a reference gas pressure;
said gas pressure responsive means communicating with said reference gas pressure and being responsive to the pressure differential between said reference gas pressure and said chamber gas pressure.

* * * * *